(12) United States Patent
Pibarot et al.

(10) Patent No.: US 10,117,450 B2
(45) Date of Patent: Nov. 6, 2018

(54) CANNED FOOD PRODUCTS HAVING A FILLING

(71) Applicant: Nestec SA, Vevey (CH)

(72) Inventors: Patrick Pibarot, Guillaucourt (FR); David Komarek, Sailly le Sec (FR)

(73) Assignee: NESTEC SA, Vevey (CH)

( * ) Notice: Subject to any disclaimer, the term of this patent is extended or adjusted under 35 U.S.C. 154(b) by 483 days.

(21) Appl. No.: 13/896,501

(22) Filed: May 17, 2013

(65) Prior Publication Data

US 2013/0309367 A1   Nov. 21, 2013

Related U.S. Application Data

(60) Provisional application No. 61/649,605, filed on May 21, 2012.

(51) Int. Cl.
| | |
|---|---|
| *A23L 35/00* | (2016.01) |
| *A23L 1/317* | (2006.01) |
| *A23K 10/20* | (2016.01) |
| *A23K 50/40* | (2016.01) |
| *A23P 20/25* | (2016.01) |
| *A23L 13/60* | (2016.01) |

(52) U.S. Cl.
CPC ............ *A23L 1/3172* (2013.01); *A23K 10/20* (2016.05); *A23K 50/40* (2016.05); *A23L 13/60* (2016.08); *A23L 13/62* (2016.08); *A23L 35/10* (2016.08); *A23P 20/25* (2016.08)

(58) Field of Classification Search
CPC . A23K 1/003; A23K 1/08; A23K 1/10; A23K 1/18; A23K 1/1846; A23K 1/186; A23K 1/1866; A23K 10/00; A23K 10/20; A23K 10/22; A23K 10/24; A23K 10/30; A23K 40/00; A23K 40/25; A23K 50/40; A23K 50/42; A23K 50/45; A23K 50/48
USPC ....... 426/102, 131, 279, 280, 282, 283, 284, 426/407, 805
See application file for complete search history.

(56) References Cited

U.S. PATENT DOCUMENTS

| 1,174,189 | A | * | 3/1916 | Smith | ........................ | A23L 3/10 |
| | | | | | | 99/369 |
| 1,721,406 | A | * | 7/1929 | Parsons | ................ | A23C 19/082 |
| | | | | | | 426/280 |

(Continued)

FOREIGN PATENT DOCUMENTS

| EP | 0024274 | 3/1981 |
| EP | 1061815 | 12/2000 |

(Continued)

OTHER PUBLICATIONS

Edley et al., Wet petfood processing; available at: http://www.petfoodindustry.com/articles/657-wet-petfood-processing; published on May 16, 2007.*

(Continued)

*Primary Examiner* — Walter A Moore

(57) ABSTRACT

The invention provides products and methods for making the products. The products comprise a container comprising a second emulsion encasing a first emulsion wherein the first emulsion and the second emulsion have a different appearance and texture. Preferably, the first emulsion is a meat emulsion and the second emulsion is a non-meat protein emulsion.

12 Claims, 1 Drawing Sheet

(56) References Cited

U.S. PATENT DOCUMENTS

| | | | | |
|---|---|---|---|---|
| 2,682,471 A * | 6/1954 | Alther | A23G 3/2023 | |
| | | | 426/102 | |
| 3,628,974 A * | 12/1971 | Battista | A22C 13/0016 | |
| | | | 106/157.3 | |
| 3,733,847 A * | 5/1973 | Powell | F25D 9/005 | |
| | | | 62/375 | |
| 3,808,340 A * | 4/1974 | Palmer | A23K 40/30 | |
| | | | 426/305 | |
| 4,781,939 A | 11/1988 | Martin | | |
| 5,093,028 A | 3/1992 | Kyogoku | | |
| 5,487,910 A * | 1/1996 | Zabel | A23D 7/003 | |
| | | | 426/574 | |
| 5,654,028 A * | 8/1997 | Christensen | A23K 50/48 | |
| | | | 426/574 | |
| 5,695,797 A | 12/1997 | Geromini et al. | | |
| 6,379,738 B1 | 4/2002 | Dingman et al. | | |
| 6,440,485 B1 | 8/2002 | Cheuk | | |
| 6,582,740 B1 | 6/2003 | May | | |
| 6,692,787 B2 | 4/2004 | Dingman | | |
| 6,911,224 B1 | 6/2005 | May | | |
| 2001/0041202 A1* | 11/2001 | Dupont | A23K 1/1866 | |
| | | | 426/407 | |
| 2002/0044990 A1* | 4/2002 | De Simone | A21D 13/0016 | |
| | | | 426/61 | |
| 2003/0044503 A1* | 3/2003 | Morgan | A23C 19/093 | |
| | | | 426/573 | |
| 2005/0147732 A1* | 7/2005 | Schwach-Abdellaoui | | |
| | | | A23L 29/275 | |
| | | | 426/656 | |
| 2006/0210675 A1 | 9/2006 | Gifford | | |
| 2010/0285200 A1* | 11/2010 | Garonzik | A23C 11/00 | |
| | | | 426/592 | |
| 2011/0108544 A1* | 5/2011 | Perez | H05B 1/0261 | |
| | | | 219/441 | |

FOREIGN PATENT DOCUMENTS

| | | |
|---|---|---|
| JP | 62104566 A | 5/1987 |
| JP | H07184621 | 7/1995 |
| JP | 11276118 A | 12/1999 |
| JP | 2000510348 | 8/2000 |
| JP | 2000515379 | 11/2000 |
| JP | 2007020417 | 2/2001 |
| JP | 2002505863 | 2/2002 |
| JP | 2005536219 | 12/2005 |
| JP | 201265565 A | 4/2012 |
| JP | 5265085 | 8/2013 |
| WO | 1998/05218 | 2/1998 |
| WO | 1998/005219 | 2/1998 |
| WO | 199930568 | 6/1999 |
| WO | 1999/045794 | 9/1999 |
| WO | 2011/076341 | 6/2001 |
| WO | 2011091111 | 7/2011 |

OTHER PUBLICATIONS

Dairy Proteins, Wisconsin Center for Dairy Research and the Wisconsin Milk Marketing Board, published Jun. 14, 2010, accessed on Feb. 7, 2017, available at: https://web.archive.org/web/20100614121406/http://future.aae.wisc.edu/publications/dairyproteins.pdf.*

Milk (fat free or skim, Calcium fortified), fatsecret.com, available at: https://web.archive.org/web/20110315061638/https://www.fatsecret.com/calories-nutrition/usda/milk-(fat-free-or-skim-calciumfortified)?portionid=63385&portionamount=100.000; published on Mar. 15, 2011; accessed on Jan. 30, 2018. (Year: 2011).*

21 CFR 133.133; 54 FR 32053, Aug. 4, 1989, as amended at 58 FR 2892, Jan. 6, 1993; accessed on Jan. 26, 2018. (Year: 1993).*

Foegeding, Gelation in Meat Batters, Reciprocal Meat Conference Proceedings, vol. 41, 1988, p. 44-47. (Year: 1988).*

International Search Report and written opinion dated Jul. 4, 2013.

Asakura Shoten, "Inspired by the Japan Canned Association", Dictionary of Canned Food Products and Retort Food Products edited under the supervision of Japan Canners Association, Dec. 1985, pp. 147-151.

Asakura Shoten, "Theory and Actual Cookery Dictionary", Dictionary of Theoretical and Practical Culinary Arts by Toko Yoshimatsu, et al, Sep. 1997, pp. 53.

* cited by examiner

CANNED FOOD PRODUCTS HAVING A FILLING

CROSS REFERENCE TO RELATED APPLICATIONS

This application claims priority to U.S. Provisional Application No. 61/649,605 filed May 21, 2012, the disclosure of which is incorporated herein by this reference.

BACKGROUND OF THE INVENTION

Field of the Invention

The invention relates generally to canned food products and particularly to canned food products that contain a second emulsion encasing a first emulsion having a different appearance and texture and to methods for making such food products.

Description of Related Art

Canned food can be of a loaf type with variations in texture and appearance from a meat loaf to an aerated mousse. These are typically prepared by comminuting raw meat material and mixing it with water, salt, spices, curing agents, gelling agents and, if necessary, fats to form a batter. The batter is then heated. The heated batter is then filled into cans to form, after retorting and cooling, a meat loaf. Variations in loaf texture and appearance are achieved by extent of particle size reduction in the batter; as well as type and level of binders in the formula.

Another common form of canned food is meat or meat analog chunks (as described in U.S. Pat. Nos. 4,781,939, 6,379,738 and 6,692,787) or slices (as described in European Patent Publication No. EP 1 565 069 A1) in gravy or sauce. Other variations include the meat or meat analog chunks in loaf (as described in U.S. Pat. No. 6,440,485), aspic or gel form. Further variations in canned food image include distinct bi-layering of chunks and loaf forms (as described in U.S. Pat. No. 6,582,740) or multi-layering of these (as described in U.S. Pat. No. 6,911,224). Other variations are made by introducing a center filling where the center filling layer is a loaf batter of a different color or texture or both, or where the center filling is chunks in gravy (as described in European Patent No. EP 1 061 815 B1). For this product, the center filling was visible on removal of the lid (top) and on emptying (bottom).

These canned food products are adequate for their purpose. However, consumers of canned food products, including pet owners and caregivers, are continually seeking novel yet appealing canned food forms or varieties. There is, therefore, a need for new canned food products that bring variety and appeal to consumers, including meat-filled type products that are highly desirable by the consumer.

SUMMARY OF THE INVENTION

It is, therefore, an object of the present invention to provide canned food products comprising a can containing a second emulsion encasing a first emulsion.

It is another object of the present invention to provide food products comprising a second emulsion encasing a first emulsion.

It is a further object of the invention to provide methods for making food products containing a second emulsion encasing a first emulsion that has a different appearance and texture when compared to the second emulsion.

It is a further object of the invention to provide multi-pack packages of the canned food products of the invention.

One or more of these or other objects are achieved by providing food products comprising a second emulsion encasing a first emulsion. The first emulsion has a first phase, the second emulsion has a second phase, and the first phase and the second phase are different. Generally, the first emulsion is a meat emulsion and the second emulsion is a non-meat protein emulsion. Due to the low miscibility or non miscibility of the first and second emulsions, the food products of the invention are food products having two separate phases.

Other and further objects, features, and advantages of the present invention will be readily apparent to those skilled in the art.

DETAILED DESCRIPTION OF THE INVENTION

Definitions

Figure 1A:
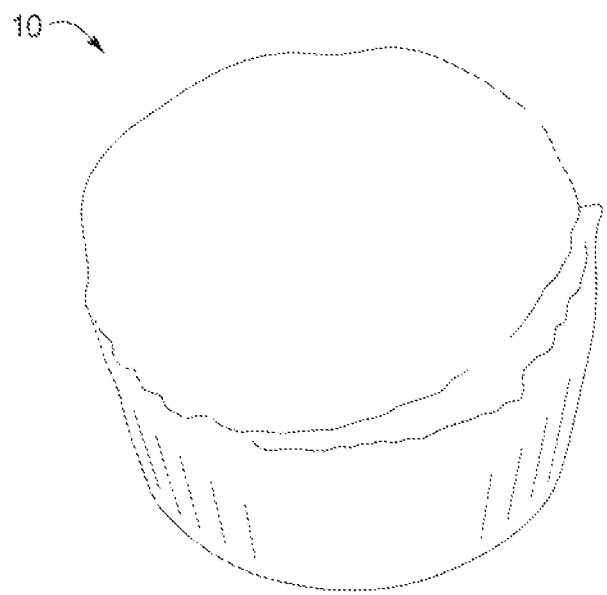
FIG. 1A shows a perspective view of a food product containing a second emulsion encasing a first emulsion in an embodiment of the invention.

The term "encased" means that a meat emulsion is completely or substantially enclosed by a non-meat protein emulsion, where the meat emulsion is substantially enclosed if less than 20% of the meat emulsion is visible on the surface for the food product.

The term "can" means a rigid retortable container, e.g., a metal container such as a metal or metal alloy can, a plastic container, a glass container, and combinations thereof.

The term "canned" means that a food product is contained in a can.

The term "companion animal" means domesticated animals such as cats, dogs, rabbits, guinea pigs, ferrets, hamsters, mice, gerbils, horses, cows, goats, sheep, donkeys, pigs, and the like.

As used herein, ranges are used herein in shorthand, so as to avoid having to list and describe each and every value within the range. Any appropriate value within the range can be selected, where appropriate, as the upper value, lower value, or the terminus of the range.

As used herein, the singular form of a word includes the plural, and vice versa, unless the context clearly dictates otherwise. Thus, the references "a", "an", and "the" are generally inclusive of the plurals of the respective terms. For example, reference to "food composition" or "a method of making a food composition" includes a plurality of such "food compositions" or "methods." Similarly, the words "comprise", "comprises", and "comprising" are to be interpreted inclusively rather than exclusively. Likewise the terms "include", "including" and "or" should all be construed to be inclusive, unless such a construction is clearly prohibited from the context.

The terms "comprising" or "including" are intended to include embodiments encompassed by the terms "consisting essentially of" and "consisting of". Similarly, the term "consisting essentially of" is intended to include embodiments encompassed by the term "consisting of".

All percentages expressed herein are by weight of the total weight of the food composition unless expressed otherwise. For example, an ingredient in an amount of 25% by weight means that the amount of the ingredient is 25% of the total weight of the food composition. Thus, if the total weight of the food composition is 100 grams, the actual amount of the ingredient corresponding to 25% by weight would be 25 grams.

The products and methods and other advances disclosed here are not limited to particular methodology, protocols, ingredients, components and reagents described herein because, as the skilled artisan will appreciate, they may vary. Further, the terminology used herein is for the purpose of describing particular embodiments only, and is not intended to, and does not, limit the scope of that which is disclosed or claimed.

Unless defined otherwise, all technical and scientific terms, terms of art, and acronyms used herein have the meanings commonly understood by one of ordinary skill in the art in the field(s) of the invention, or in the field(s) where the term is used. Although any compositions, methods, articles of manufacture, or other means or materials similar or equivalent to those described herein can be used in the practice of the present invention, the preferred compositions, methods, articles of manufacture, or other means or materials are described herein.

All patents, patent applications, publications, technical and/or scholarly articles, and other references cited or referred to herein are in their entirety incorporated herein by reference to the extent allowed by law. The discussion of those references is intended merely to summarize the assertions made therein. No admission is made that any such patents, patent applications, publications or references, or any portion thereof, are relevant, material, or prior art. The right to challenge the accuracy and pertinence of any assertion of such patents, patent applications, publications, and other references as relevant, material, or prior art is specifically reserved.

The Invention

Figure 1B:
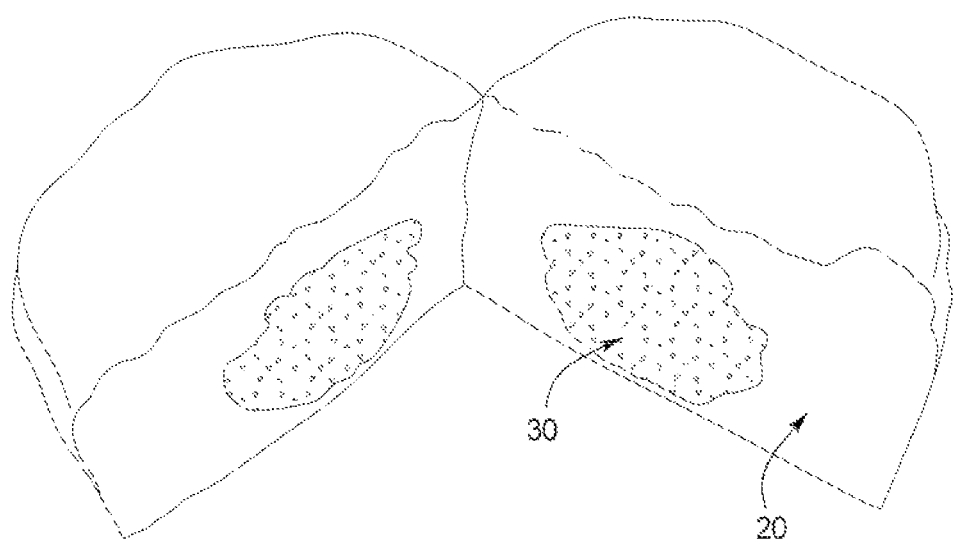
FIG. 1B shows a cross-section of the food product containing a second emulsion encasing a first emulsion of FIG. 1A.

In one aspect, the invention provides products comprising a can, the can comprising a first emulsion in the interior of the can and a second emulsion encasing the first emulsion. Generally, the second emulsion forms an outer matrix encasing the first emulsion and the first and second emulsions have a different appearance, texture, or other distinguishing property. In one embodiment shown by FIGS. 1A-1B, the invention provides a food product 10 including a firmly set second emulsion 20 forming an outer matrix encasing a first emulsion 30.

The first emulsion 30 and the second emulsion 20 comprise any suitable amount of the food product 10. In various embodiments, the first emulsion comprises from about 20 to about 80% of the food product, preferably from about 30 to about 70%. In certain embodiments, the first emulsion comprises from about 25 to about 75% of the food product and the second emulsion comprises the remaining 75 to 25% of the food product.

Generally, the first emulsion 30 is a meat emulsion and the second emulsion 20 is a non-meat protein emulsion.

The non-meat protein emulsion comprises any suitable ingredients, e.g., globular proteins and/or micellar proteins. The proteins in the non-meat protein emulsion may be derived from any suitable non-meat protein source, including vegetables, eggs, milk, or blood. Suitable vegetable sources include, for example, soy, pea, potato, alfalfa, and peanuts. Preferably, the proteins in the non-meat protein emulsion are derived from eggs, milk, or blood.

The globular proteins can be solubilized or suspended in water. Suitable globular proteins include globulins, albumins, or mixtures thereof. The micellar suspended proteins can include, e.g., casein.

The meat emulsion comprises any suitable ingredients, e.g., fibrillar protein and polysaccharides. Suitable fibrillar proteins include myosin, actin, actomyosin, collagen, and mixtures thereof, e.g., protein from bovine, equine, ovine, avian, porcine, caprine, ovine, and piscine. Examples of suitable polysaccharides include starches, gums or mixtures thereof. The meat emulsion can be in the form of a gel, a mousse, a sauce-like filling, a juicy filling, or a creamy filling.

In another embodiment, the meat emulsion is in the form of a gel and comprises muscle meat and collagen. The non-meat protein emulsion comprises globular and micellar proteins. The resulting food product 10 is a firmly set protein matrix 20 encasing a gelled meat emulsion 30. The meat emulsion 30 comprises 25 to 75% of the food product 10 and the second non-meat protein emulsion 20 correspondingly comprises the remaining 75 to 25% of the food product 10.

The meat emulsion may optionally comprise a non-gelling thickener. The non-gelling thickener creates a creamy meat-like sauce filling encased by the firmly set outer non-meat protein matrix upon retorting.

The first emulsion 30 and the second emulsion 20 are not miscible or have low miscibility and thus form two different phases that do not mix when the food product is formed. The food product 10 is therefore composed of two separate phases—an inner phase corresponding to the first emulsion 30 and an outer phase corresponding to the second emulsion 20. The phase separation is obtained due to: (1) the non-miscibility or poor miscibility of globular and fibrillar proteins; and (2) the non-miscibility or poor miscibility of meat emulsion, e.g. polysaccharides mixed with meat emulsion have a poor miscibility with globular and micellar proteins.

At least one of the first emulsion 30 and the second emulsion 20 can optionally include additional ingredients. For example, the first emulsion 30 and/or the second emulsion 20 comprise visible pieces of real or simulated ingredients for aesthetic appeal or nutritional function. In some embodiments, at least one of the first emulsion 30 or the second emulsion 20 comprise solubilized or dispersed nutritional ingredients, flavor or aroma compounds, or encapsulated flavors or nutrients for release during retorting, in the mouth or in the alimentary tract.

In another aspect, the invention provides methods for making products. The methods comprise forming a first emulsion, forming a second emulsion, filling the first emulsion and the second emulsion into a can such that the second emulsion encases the first emulsion. In an embodiment, a method for making the food product 10 includes forming the first emulsion 30, separately forming the second emulsion 20, pumping the first emulsion 30 into a can, and pumping the second emulsion 20 into the can such that the second emulsion encases the first emulsion. The method may further include the steps of placing a lid on the can after the first emulsion 30 and the second emulsion 20 have been filled into the can, sealing the can (hermetically sealing the can), and retorting the can. Generally, the can is subsequently cooled or allowed to equilibrate to room temperature. The resulting food product 10 is a firmly set second emulsion 20 forming an outer matrix completely or substantially encasing the first emulsion 30.

The can may be retorted at any suitable temperature for a suitable amount of time. For example, the can may be retorted at 121° C. for 25 to 50 minutes.

The can may also be cooled to any suitable temperature. For example, the can may be cooled to a temperature of 20 to 35° C. In an embodiment, the can is cooled to 22 to 26° C.

The filled can may optionally be inverted before retorting.

The food product is useful as a food product for any animal that consumes such food products. In a preferred embodiment, the food product is a companion animal food product. e.g., a pet food for dogs or cats.

In an alternative embodiment, a method for making the food product 10 includes filling the can by pumping half of the second emulsion 20 into the can, followed by pumping the first emulsion 30 onto the second emulsion 20, and pumping the remaining half of the second emulsion 20 onto the first emulsion 30 so that it covers the first emulsion 30. The method may further include the steps of placing a lid on the filled can, hermetically sealing the filled can, retorting the filled can, and cooling the retorted can.

An alternative method for making the food product 10 includes delivering the second emulsion 20 to a can and injecting the first emulsion 30 into the second emulsion 20. The food product 10 may also be produced by co-extruding the first emulsion 30 at a first rate and the second emulsion 20 at a second rate and adjusting the first rate and the second rate to allow the second emulsion 20 to encase the first emulsion 30.

Meat and non-meat emulsions and methods for making such emulsions are known to skilled artisans.

In another aspect, the invention provides multi-pack packages useful for conveniently providing the canned food products of the invention to consumers. The multi-pack packages comprise a plurality of cans containing a canned food product of the invention arranged in an array and one or more devices for retaining the cans in the array. In some embodiments, the multi-pack packages have one or more handles affixed to the packages to facilitate handling and transporting the packages. In various embodiments, the devices are boxes made from paper, plastic, polymers, and combinations thereof. In others, the devices are systems of connected plastic rings affixed to each of the containers. In still others, the devices are wrappings of plastic of similar materials. e.g., twelve cans stacked in an array and wrapped in plastic. In preferred embodiments, the multi-pack packages further comprise one or more indicia describing the contents of the containers in the packages, e.g., labels, printing on the packages, stickers, and the like. In other embodiments, the devices further comprise one or more windows that permit the package contents to be viewed without opening the multi-pack package. In some embodiments, the windows are a transparent portion of the devices. In others, the windows are missing portions of the devices that permit the containers to be viewed without opening the multi-pack package.

EXAMPLES

The invention can be further illustrated by the following examples, although it will be understood that these examples are included merely for purposes of illustration and are not intended to limit the scope of the invention unless otherwise specifically indicated.

Example 1

A 50 Kg batch of meat emulsion (filling) preparation was made according to the formulation shown in Table 1(a). The fish was crushed into pieces of about 10 cm in size and the pieces were then ground in a meat grinder through 3.175 mm openings. Separately, carob gum and blood was dispersed in water in a mixing vessel with a high speed blender. The ground fish was then transferred to a mixer-cooker. With the mixer running, the gum/blood dispersion was added to the ground fish and the mixture heated by steam injection to 40° C.

TABLE 1(a)

| Meat Emulsion | |
| --- | --- |
| Ingredients | % (w/w) |
| Fish - Cod | 49 |
| Blood | 1 |
| Carob gum | 2 |
| Water | 48 |
| Total | 100 |

A 100 Kg batch of non-meat protein emulsion was prepared according to formulation shown in Table 1(b).

TABLE 1(b)

| Non-Meat Protein Emulsion | |
| --- | --- |
| Ingredients | % (w/w) |
| Egg white powder | 5.3 |
| Milk powder | 13.3 |
| Egg yolk powder | 1.3 |
| Water | 53.4 |
| Poultry fat (liquid) | 26.7 |
| Total | 100 |

The dry ingredients, except egg yolk powder, were added to the water in a stainless kettle and whisked for 5 minutes until a foam was built. Poultry fat was preheated to 70° C. then added, together with the egg yolk, to the foamed mixture with continued whisking. The mixture was the heated indirectly by steam for 20 minutes.

Example 2

The meat emulsion and non-meat protein emulsions were combined as follows. 30 grams of the meat emulsion was delivered to an 85 gram can by a filling head. 50 grams of the protein emulsion was then added to the can where it encircles the meat emulsion. The can was inverted and retorted at 121° C. for 40 minutes and then cooled to room temperature (20 to 23° C.). The can was opened and the contents examined. The food product in the can was a meat emulsion completely encased by a non-meat emulsion.

Example 3

Products were made as in Example 2 using formulations shown for meat emulsion in Table 2(a) and non-meat protein emulsion in Table 2(b). The can was opened and the contents examined. The food product in the can was a meat emulsion completely encased by a non-meat emulsion.

TABLE 2(a)

Meat Emulsion

| Ingredients | % (w/w) |
| --- | --- |
| Fish - Cod | 49 |
| Blood | 1 |
| Guar gum | 1 |
| Water | 49 |
| Total | 100 |

TABLE 2(b)

Non-Meat Protein Emulsion

| Ingredients | % (w/w) |
| --- | --- |
| Egg white powder | 5.3 |
| Whey powder | 13.3 |
| Egg yolk powder | 1.3 |
| Water | 53.4 |
| Poultry fat (liquid) | 26.7 |
| Total | 100 |

Example 4

Products were made as in Example 2 using formulations shown for meat emulsion in Table 3(a) and non-meat protein emulsion in Table 3(b). The can was opened and the contents examined. The food product in the can was a meat emulsion completely encased by a non-meat emulsion.

TABLE 3(a)

Meat Emulsion

| Ingredients | % (w/w) |
| --- | --- |
| Fish - Cod | 49 |
| Blood | 1 |
| Carboxy Methyl Cellulose | 1 |
| Water | 49 |
| Total | 100 |

TABLE 3(b)

Non-Meat Protein Emulsion

| Ingredients | % (w/w) |
| --- | --- |
| Pork plasma powder | 5.3 |
| Milk powder | 13.3 |
| Egg yolk powder | 1.3 |
| Water | 53.4 |
| Poultry fat (liquid) | 26.7 |
| Total | 100 |

Example 5

Products were made as in Example 2 using formulations shown for meat emulsion in Table 4(a) and non-meat protein emulsion in Table 4(b). The can was opened and the contents examined. The food product in the can was a meat emulsion completely encased by a non-meat emulsion.

TABLE 4(a)

Meat Emulsion

| Ingredients | % (w/w) |
| --- | --- |
| Fish - Cod | 49 |
| Blood | 1 |
| Xanthan gum | 2 |
| Water | 48 |
| Total | 100 |

TABLE 4(b)

Non-Meat Protein Emulsion

| Ingredients | % (w/w) |
| --- | --- |
| Casein (powdered) | 5.3 |
| Milk powder | 13.3 |
| Egg yolk powder | 1.3 |
| Water | 53.4 |
| Poultry fat (liquid) | 26.7 |
| Total | 100 |

Example 6

A 100 Kg batch of meat emulsion (filling) preparation was made according to the formulation shown in Table 5(a). The meat ingredients were weighed and crushed into pieces of about 10 cm in size. The pieces were then ground in a meat grinder through 3.175 mm openings and transferred to a stainless mixer. 65 kg potable water was added and mixer then turned on. With continuous mixing, the dry ingredients (starch, gums, vitamins/minerals/red color/flavors blend) were slowly added. Mixing was continued for an additional 5 minutes. This meat mixture was then fed through a grid emulsifier which resulted in a homogenous meat emulsion.

TABLE 5(a)

Meat Emulsion

| | Ingredients | Kg |
| --- | --- | --- |
| Meats | Poultry Meat/By-Products | 15.1 |
| | Liver | 8.6 |
| | Pork Lungs | 5.3 |
| | Pork Kidneys | 3.2 |
| Powders/Dries | Modified Corn Starch | 0.39 |
| | Carob Gum | 0.60 |
| | Xanthan Gum | 0.03 |
| | Vitamins/Minerals/Red Color/Flavors Blended | 1.78 |
| Water | | 65.0 |
| | Total | 100.0 |

A non-meat protein emulsion was prepared as follows according to the proportions shown in Table 5(b). Liquid 1 was prepared by dissolving 200 grams of sodium chloride in 46 Kg water at room temperature (22 to 26° C.) in a stainless steel vessel with a motorized stirrer. 20 Kg of egg white powder was then poured in while stirring continuously. The mixture was stirred for about 10 minutes when the egg white powder was fully distributed and a foam developed. Liquid 2 was prepared in a separate container as for Liquid 1 using 6 Kg egg yolk powder and 15 Kg water. Liquid 3 was prepared in a separate container as for Liquid 2 using 45 Kg milk powder and 120 Kg water.

TABLE 5(b)

Non-Meat Protein Emulsion

| | Ingredients | Kg |
|---|---|---|
| Liquid 1 | Egg white powder | 20 |
| | Sodium Chloride | 0.2 |
| | Water | 46 |
| Liquid 2 | Egg yolk powder | 6 |
| | Water | 15 |
| Liquid 3 | Milk powder | 45 |
| | Water | 120 |
| Liquid 4 | Poultry fat | 90 |
| | Wheat flour | 22.5 |
| | Total | 364.7 |

Liquid 4 was prepared by heating 90 Kg poultry fat in a jacketed vessel with a motorized mixing attachment to 80° C. While maintaining this temperature. 22.5 Kg wheat flour was poured as a steady stream into the fat while mixing continuously. After the addition of the wheat flour was completed, mixing continued for another 7 minutes until a homogenous creamy mixture was obtained. After this was achieved, the non-meat protein emulsion was made by continuously mixing Liquid 4 and pouring Liquid 3 into Liquid 4 followed by Liquid 2. Mixing continued for 5 minutes. Liquid 1 was then combined with the mixture to from a homogeneous foamy non-meat protein emulsion.

Example 7

The meat emulsion and non-meat protein emulsions from Example 6 were combined in two variations as follows. (A) 30 grams of the meat emulsion was delivered to an 85 grain can by a filling head. 50 grams of the non-meat protein emulsion was then added to the can where it encircles the meat emulsion; (B) 40 grams of the meat emulsion was delivered to an 85 gram can by a filling head. 40 grams of the non-meat protein emulsion was then added to the can where it encircles the meat emulsion. Cans were then retorted at 121° C. for 40 minutes and cooled to room temperature (22 to 26° C.). The cans were opened and examined. The food product in the cans was a meat emulsion completely encased by a non-meat emulsion.

In the specification, there have been disclosed typical preferred embodiments of the invention. Although specific terms are employed, they are used in a generic and descriptive sense only and not for purposes of limitation. The scope of the invention is set forth in the claims. Obviously many modifications and variations of the invention are possible in light of the above teachings. It is therefore to be understood that within the scope of the appended claims the invention may be practiced otherwise than as specifically described.

What is claimed is:

1. A canned food product comprising:
   a can comprising:
      a homogenous meat emulsion in the interior of the can, wherein the meat emulsion is a gel and comprises muscle meat and collagen; and
      a homogenous foamy non-meat emulsion completely encasing the meat emulsion and comprising water, an animal fat and at least one protein selected from the group consisting of vegetable proteins, egg proteins, blood and milk proteins,
      wherein the meat emulsion and the foamy non-meat emulsion are not miscible or have low miscibility and form two different phases in the canned food product.

2. The product of claim 1 wherein the meat emulsion comprises a gum.

3. The product of claim 1 wherein the foamy non-meat emulsion comprises at least one element selected from the group consisting of palatability enhancers, colorants, preservatives, solubilized nutritional ingredients, flavor compounds, aroma compounds, encapsulated flavors, and encapsulated nutrients.

4. The product of claim 1 wherein the product is formulated for a companion animal.

5. A method for making a canned food product comprising:
   forming a homogenous meat emulsion, wherein the meat emulsion is a gel and comprises muscle meat and collagen;
   forming a foamy non-meat emulsion by mixing water, an animal fat and at least one protein selected from the group consisting of vegetable proteins, egg proteins, blood and milk proteins, creating a foam in the mixture, and heating the foamed mixture;
   filling the meat emulsion and the foamy non-meat emulsion into a can such that the foamy non-meat emulsion completely encases the meat emulsion;
   retorting the filled can; and
   cooling the retorted can to a temperature of 20° C. to 35° C.

6. The method of claim 5 further comprising hermetically sealing the can.

7. The method of claim 5 wherein the filled can is inverted before the retorting.

8. The method of claim 5 wherein the filled can is retorted at a temperature of 121° C. for 25 to 50 minutes.

9. The method of claim 5 wherein the steps of filling the can with the meat emulsion and filling the can with the non-meat emulsion include delivering a portion of the non-meat emulsion to the can, adding the meat emulsion onto the portion of the non-meat emulsion, and covering the meat emulsion with a remaining portion of the non-meat emulsion.

10. The method of claim 5 wherein the steps of filling the can with the meat emulsion and filling the can with the non-meat emulsion include delivering the non-meat emulsion to the can and injecting the meat emulsion into the non-meat emulsion.

11. The method of claim 5 wherein the steps of filling the can with the meat emulsion and filling the can with the non-meat emulsion include co-extruding the meat emulsion at a first rate and the non-meat emulsion at a second rate and adjusting the first rate and the second rate to allow the non-meat emulsion to encase the meat emulsion.

12. A product made by a method comprising:
   forming a homogenous meat emulsion, wherein the meat emulsion is a gel and comprises muscle meat and collagen;
   forming a foamy non-meat emulsion by mixing water, an animal fat and at least one protein selected from the group consisting of egg proteins and milk proteins, creating a foam in the mixture, and heating the foamed mixture;
   filling the meat emulsion and the foamy non-meat emulsion into a can such that the foamy non-meat emulsion completely encases the meat emulsion;
   retorting the filled can; and
   cooling the retorted can to a temperature of 20° C. to 35° C.

* * * * *